(12) United States Patent
Takayama

(10) Patent No.: US 7,209,253 B2
(45) Date of Patent: Apr. 24, 2007

(54) DATA TRANSMISSION APPARATUS, DATA TRANSMISSION METHOD AND DATA TRANSMISSION PROGRAM

(75) Inventor: Norihisa Takayama, San Jose, CA (US)

(73) Assignee: Minolta Co., Ltd., Osaka-shi, Osaka (KP)

( * ) Notice: Subject to any disclaimer, the term of this patent is extended or adjusted under 35 U.S.C. 154(b) by 955 days.

(21) Appl. No.: 10/098,504

(22) Filed: Mar. 18, 2002

(65) Prior Publication Data

US 2002/0140986 A1  Oct. 3, 2002

(30) Foreign Application Priority Data

Mar. 30, 2001 (JP) .............................. 2001-099744

(51) Int. Cl.
*G06F 15/00* (2006.01)
(52) U.S. Cl. .................... 358/1.15; 358/402; 358/403; 358/405; 379/90.01; 709/206; 709/245
(58) Field of Classification Search ................ 358/402, 358/403, 405, 1.15; 379/90.01; 709/245
See application file for complete search history.

(56) References Cited

U.S. PATENT DOCUMENTS

| | | | |
|---|---|---|---|
| 5,291,302 A | * | 3/1994 | Gordon et al. .............. 358/400 |
| 6,014,688 A | | 1/2000 | Venkatraman et al. |
| 6,023,345 A | * | 2/2000 | Bloomfield ................. 358/402 |
| 6,208,426 B1 | * | 3/2001 | Saito et al. ................ 358/1.15 |
| 6,441,916 B1 | * | 8/2002 | Toyoda ...................... 358/1.15 |
| 6,532,496 B1 | * | 3/2003 | Iwata ......................... 709/245 |
| 6,876,462 B2 | * | 4/2005 | Okada et al. .............. 358/1.15 |

FOREIGN PATENT DOCUMENTS

| | | |
|---|---|---|
| JP | 5014405 | 1/1993 |
| JP | 10031636 | 2/1998 |
| JP | 10133972 | 5/1998 |
| JP | 10-283280 | 10/1998 |
| JP | 11-150645 | 6/1999 |
| JP | 11212891 | 8/1999 |
| JP | 11282773 | 10/1999 |
| JP | 2000-20424 | 1/2000 |
| JP | 2000-29804 | 1/2000 |
| JP | 2000172588 | 6/2000 |
| JP | 2000276416 | 10/2000 |
| JP | 2001014235 | 1/2001 |

* cited by examiner

*Primary Examiner*—Douglas Q. Tran
*Assistant Examiner*—Michael Burleson
(74) *Attorney, Agent, or Firm*—Buchanan Ingersoll & Rooney PC

(57) ABSTRACT

A data transmission apparatus, method and computer program capable of delivering a large-sized data file to a recipient using e-mail without the need for special installation of a software program on the side of the recipient, in which a data to be delivered is sent to a recipient as an attachment to a first e-mail, and a tool program by which to obtain the data stored in a prescribed storage area beforehand is sent to the recipient via a second e-mail if transmission error has occurred in connection with the first e-mail.

18 Claims, 7 Drawing Sheets

Fig. 7

<ACCESS INFORMATION>

- IP ADDRESS (COMPUTER NAME)
- PASS NAME IN COMPUTER
- IMAGE FILE NAME
- AUTHENTICATION INFORMATION
  (USER NAME, PASSWORD)

DATA TRANSMISSION APPARATUS, DATA TRANSMISSION METHOD AND DATA TRANSMISSION PROGRAM

This application is based on Japanese Patent Application No. 2001-99744 filed in Japan on Mar. 30, 2001, the entire content of which is hereby incorporated by reference.

BACKGROUND OF THE INVENTION

1. Field of the Invention

This invention relates to a technology to deliver prescribed data to a recipient using e-mail.

2. Description of Related Art

A technology by which to send image data as an attachment to e-mail is conventionally known.

Furthermore, a technology is also known by which to send image data not directly via e-mail but to maintain it in a specific spool and send via e-mail only the URL (Uniform Resource Locator) information that indicates the location at which the data is stored.

In the conventional art described above, however, the problem exists with the former technology that if the size of the data file attached to the e-mail exceeds a certain maximum limit, the server that relays the e-mail may refuse delivery.

The latter technology also entails the problem that a software program that enables communication using a prescribed protocol (such as FTP) must be specially installed on the recipient's computer or other apparatus that is to receive the image data.

OBJECT AND SUMMARY

An object of the present invention is to provide an improved data transmission apparatus, etc., that resolve the various problems described above.

Another object of the present invention is to provide a data transmission apparatus, etc. that are capable of delivering a large-sized data file to the recipient using e-mail without the need for special installation of a software program on the side of the recipient.

These objects are realized by providing a data transmission apparatus comprising:

an e-mail transmission unit that sends e-mail;

a data forwarding unit that forwards data to a prescribed storage area; and a controller that controls the e-mail transmission unit such that a tool program by which to obtain the data stored in the prescribed storage area is sent to the prescribed recipient using e-mail.

It is preferred that the above data transmission apparatus also include recognition unit that recognizes e-mail transmission errors, and that the controller controls the e-mail transmission unit such that it sends to the prescribed recipient a first e-mail to which the data is attached, and where a transmission error is recognized by the recognition unit in connection with the first e-mail, the controller controls the e-mail transmission unit such that the tool program is sent to the prescribed recipient using a second e-mail.

In the above data transmission apparatus, the storage area may comprise storage unit residing inside the data transmission apparatus, or an external device other than the data transmission apparatus or storage unit inside such external device.

In the above data transmission apparatus, the tool program may include access information based on which the prescribed recipient can access the data stored in the storage area. It is preferred that this access information be incorporated therein in a form such that the confidentiality thereof is maintained.

The above data transmission apparatus may further include an image reader that reads the image of a prescribed original document to obtain image data, and the data to be handled may comprise the image data obtained by the image reader.

These objects are also attained by providing a method for delivering data, comprising:

(a) a step of storing data in a prescribed storage area; and (b) a step of sending to the prescribed recipient via e-mail a tool program by which to obtain the data stored in the prescribed storage area.

These objects are also attained by providing a computer program that makes a computer perform a routine comprising:

(a) a step of storing data in a prescribed storage area; and (b) a step of sending to the prescribed recipient via e-mail a tool program by which to obtain the data stored in the prescribed storage area.

BRIEF DESCRIPTION OF THE DRAWINGS

These and other objects and features of the present invention will become clear from the following description taken in conjunction with the preferred embodiments thereof with reference to the accompanying drawings, in which:

FIG. 7 is a drawing showing access information; and

DETAILED DESCRIPTION OF THE PREFERRED EMBODIMENTS

An embodiment of the present invention will be described below with reference to the drawings.

<A. Construction>

Figure 1:
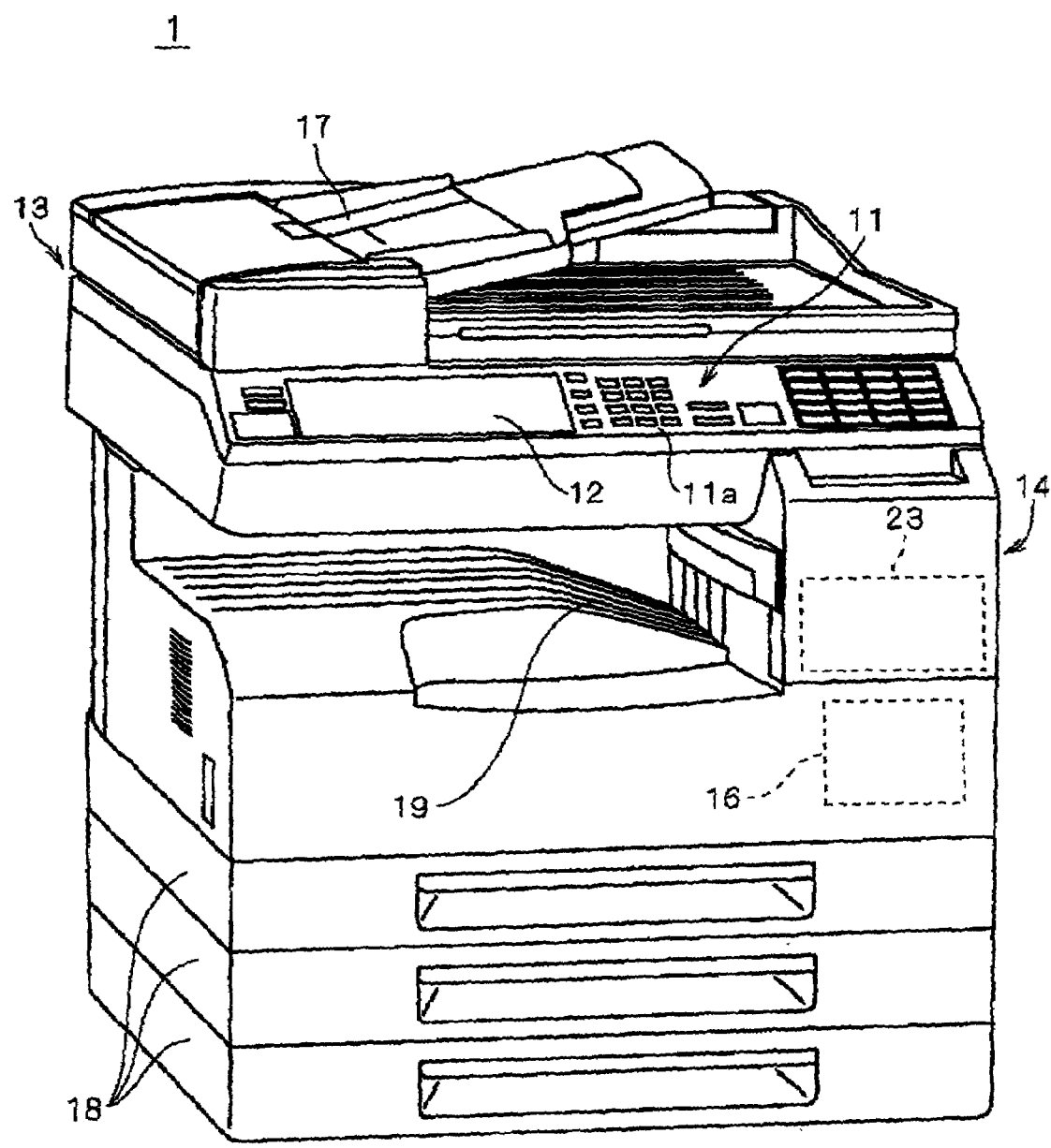
FIG. 1 is a drawing showing the external view of an MFP 1 comprising the data transmission apparatus pertaining to an embodiment of the present invention.

FIG. 1 is a drawing showing the external view of a multi-function peripheral (hereinafter abbreviated as 'MFP') 1 comprising the data transmission apparatus of this embodiment. The MFP 1 is a multi-function machine that functions as a scanner, copier, printer, facsimile machine and the like, and can transmit and receive data over a network.

As shown in FIG. 1, the MFP 1 includes an operation unit 11 that has multiple keys 11a and receives various instructions through user input using these keys and input of data such as letters and numbers, a display 12 that displays user instruction menus and information pertaining to the obtained image, a scanner unit 13 that obtains image data through the electrooptical reading of an original document, and a printer unit 14 that prints images on recording sheets based on image data.

The MFP 1 further includes a feeder unit 17 that is located at the top of the main unit and sends original documents to the scanner unit 13, a paper supply unit 18 that is located at the bottom of the main unit and sends recording sheets to the printer unit 14, a tray 19 located in the middle of the main unit onto which recording sheets on which images have been printed by the printer unit 14 are ejected, an internal communication unit 16 that sends and receives image data and the like to and from external devices over a network, and a storage unit 23 that stores such data. In addition, while not shown in the drawing, the MFP 1 has a network interface, and the communication unit 16 is connected to the network via the network interface such that it can send and receive various types of data to and from external devices.

The display 12 is used for various types of display, including display of a list of receiving addresses for data transmission, while the operation unit 11 is used for various types of input, including user selection of a receiving address, and these components function as essential elements of the user interface.

The scanner unit 13 obtains image data through the electrooptical reading of image information, such as photographs, letters, drawings and the like, from an original document. The obtained image data (density data) is converted into digital data by an image processing unit not shown in the drawing, and after undergoing various types of public-domain image processing, the data is sent to the printer unit 14 for image printing or to the communication unit 16 for data transmission or stored in the storage unit 23 for future use.

The printer unit 14 prints images on recording sheets based on image data obtained by the scanner unit 13, image data received from an external device via the communication unit 16, or the image data stored in the storage unit 23.

The communication unit 16 sends and receives facsimile data over public telephone lines, and in addition sends and receives data using e-mail or the like over a network such as a LAN or the Internet to and from external devices connected to the network. In this way, the MFP 1 functions not only as a facsimile device that performs normal facsimile communication, but also as an e-mail communication terminal. Therefore, it can send and receive various types of image data as an attached file to an e-mail. Moreover, the network communication performed by the MFP 1 can be performed over a land line network or a wireless network, but in the example shown in the drawing, the land line-based communication method is adopted.

Figure 2:
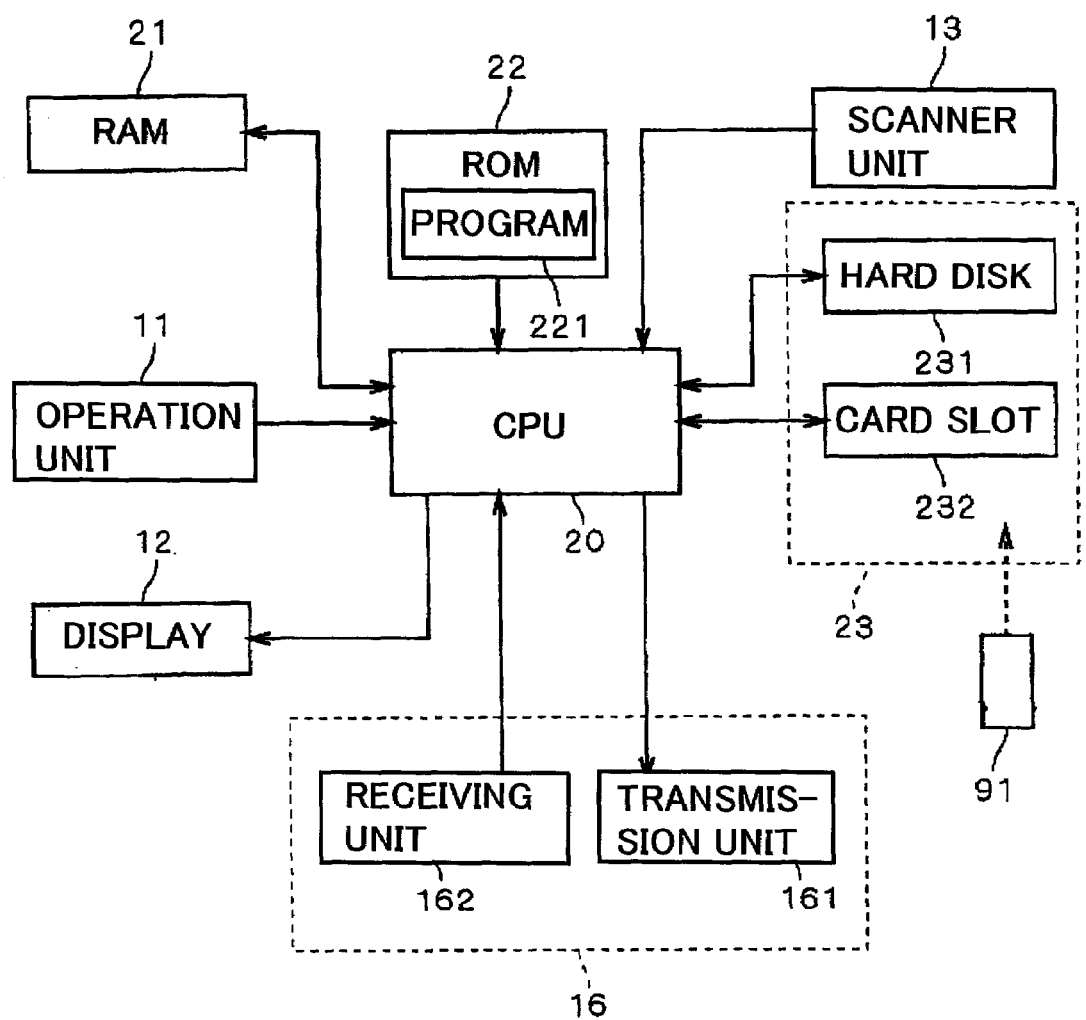
FIG. 2 is a partial block diagram of the functions of the MFP 1.

FIG. 2 is a block diagram showing the part of the MFP 1 construction that mainly pertains to this embodiment. The MFP 1 has a CPU 20 that performs various types of arithmetic processing and controls the overall operation of the MFP 1. Connected to the CPU 20 are a RAM 21 that stores various types of data and a ROM 22 that stores a prescribed software program (hereinafter referred to simply as 'program') 221. Also connected to the CPU 20 are the operation unit 11, the display 12, the scanner unit 13, and the storage unit 23. The storage unit 23 comprises a hard disk 231 that stores various types of data such as image data and a card slot 232 that reads information from a memory card 91. The RAM 21 comprises a nonvolatile RAM.

Based on this construction, various types of data can be transferred under the control of the CPU 20 among the RAM 21, the scanner unit 13, the hard disk 231, and the memory card 91 mounted in the card slot 232, and information stored in the RAM 21, the hard disk 231 or the memory card 91 may be displayed on the display 12 via the control of the CPU 20.

Also connected to the CPU 20 is the communication unit 16, which has a transmission unit 161 and a receiving unit 162 that send and receive data to and from external devices connected over the network.

As described above, the MFP 1 is constructed as a computer system (hereinafter referred to simply as 'computer') that has the CPU 20 and the other components. Through the computer execution of the prescribed program, the MFP 1 functions as a data transmission apparatus having the various functions described below.

The program 221 is stored in the ROM 22 in this embodiment, but it may be stored in the RAM 21 instead. A program to be stored in the RAM 21 is obtained from a memory card 91 comprising a recording medium, i.e., by reading the program from the memory card 91. Alternatively, instead of directly reading it from a recording medium such as the memory card 91, a program incorporated in the MFP 1 via communication over the network may be read into the RAM 21.

Figure 3:
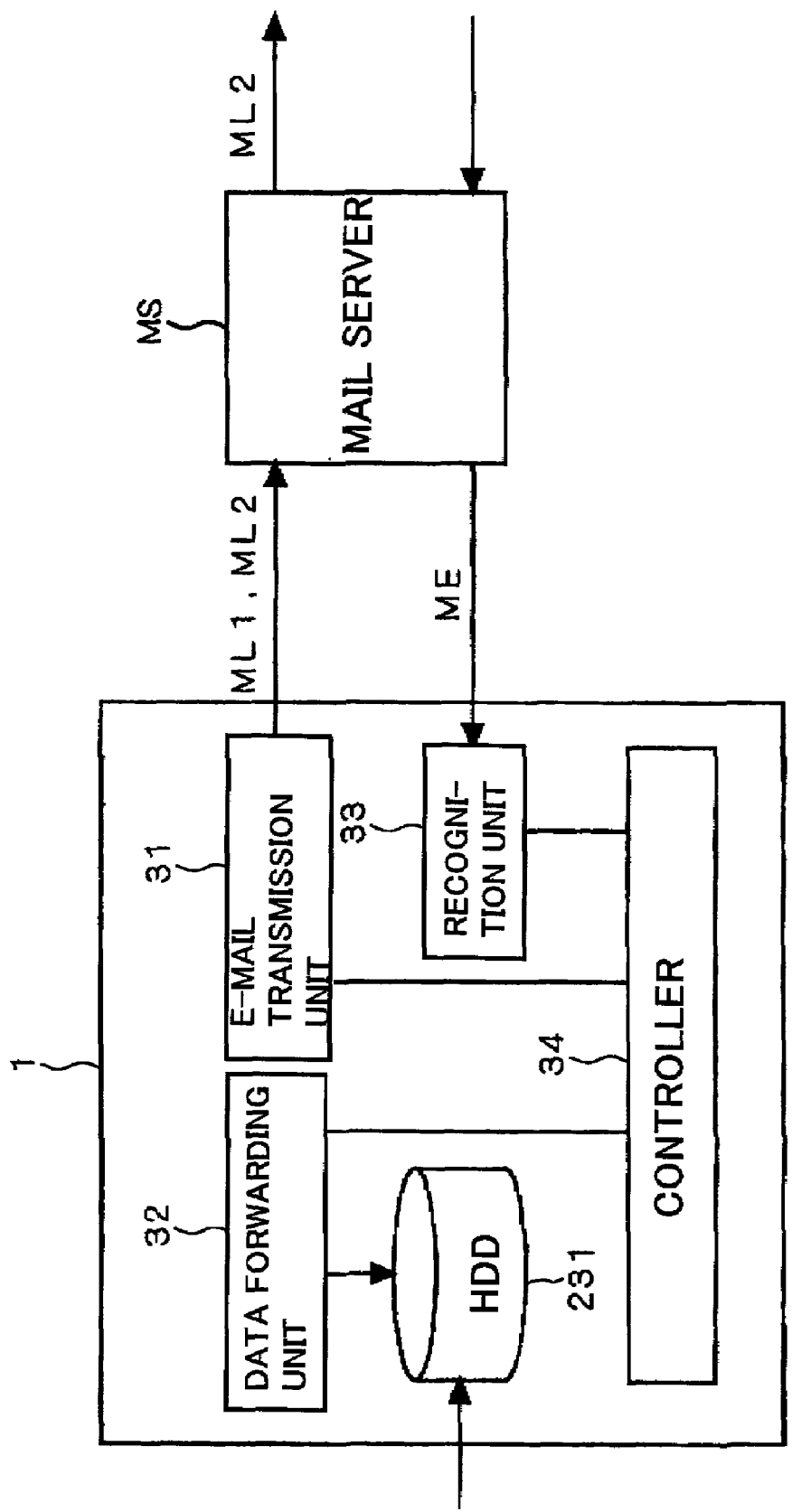
FIG. 3 is a block diagram of the functions of the MFP 1 when it operates as a data transmission apparatus.

FIG. 3 is a block diagram showing the functions of the MFP 1 when it operates as a data transmission apparatus. As shown in FIG. 3, the MFP 1 includes an e-mail transmission unit 31 that sends e-mail, a data forwarding unit (or data storage unit) 32 that forwards data to a prescribed storage area for storage, a recognition unit 33 that recognizes errors in e-mail transmissions and a controller 34 that controls the e-mail transmission unit 31 such that a tool program TP (described below) used to obtain the data stored in the prescribed storage area will be sent to the prescribed recipient using e-mail.

The e-mail transmission unit 31 has a function to send e-mail. This function is realized through cooperation between the CPU 20 and the transmission unit 161 or other components. In addition, as described below, the types of e-mail that may be sent include regular e-mail to which no files are attached, e-mail ML1 to which data such as image data is attached, and e-mail ML2 to which a prescribed tool program TP is attached.

The data forwarding unit 32 has a function to forward data to a prescribed storage area for storage. Specifically, this function is realized when the CPU 20 or the like forwards the image data stored in the RAM 21 to the hard disk 231, which functions as a storage area, such that the image data will be stored therein. As described below, the prescribed storage area is not limited to the storage unit located inside the MFP 1 (such as the hard disk 231, for example), and may comprise an external device other than the MFP 1 or the storage unit in such external device.

Moreover, the recognition unit 33 has a function to recognize e-mail transmission errors. This function is realized through a determination by the CPU 20 as to whether or not the information on a received e-mail obtained by the receiving unit 162 through access of the mail server MS includes any transmission error information.

The controller 34 controls the e-mail transmission unit 31 such that a first e-mail ML1 to which data is attached will be sent to a prescribed recipient, and where a transmission error is recognized by the recognition unit 33 regarding the first e-mail ML1, the controller 34 controls the e-mail transmission unit 31 such that a tool program TP will be sent to the prescribed recipient using a second e-mail ML2.

<B. Operation>

Figure 4:
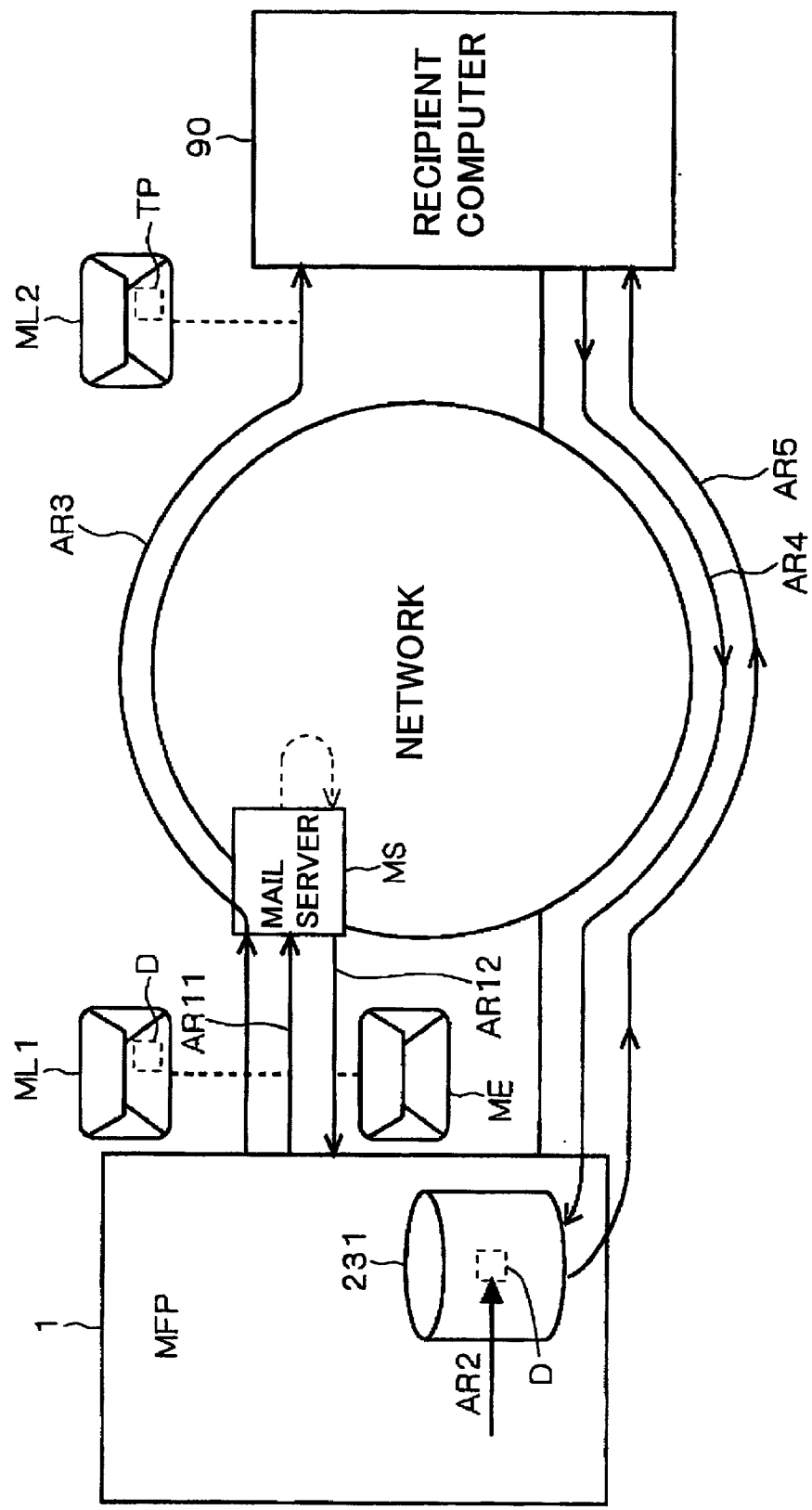
FIG. 4 is a drawing showing the outline of the operation pertaining to this embodiment.
Figure 5:
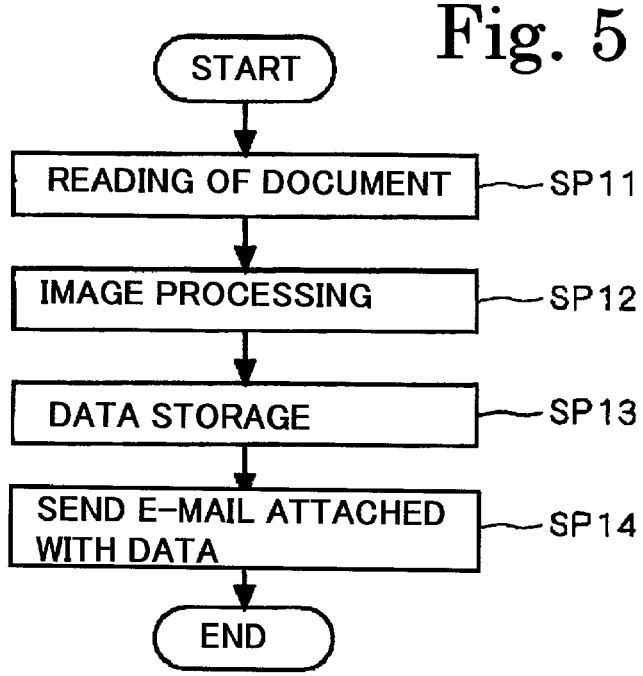
FIG. 5 is a flow chart showing the details of the transmission operation.
Figure 6:
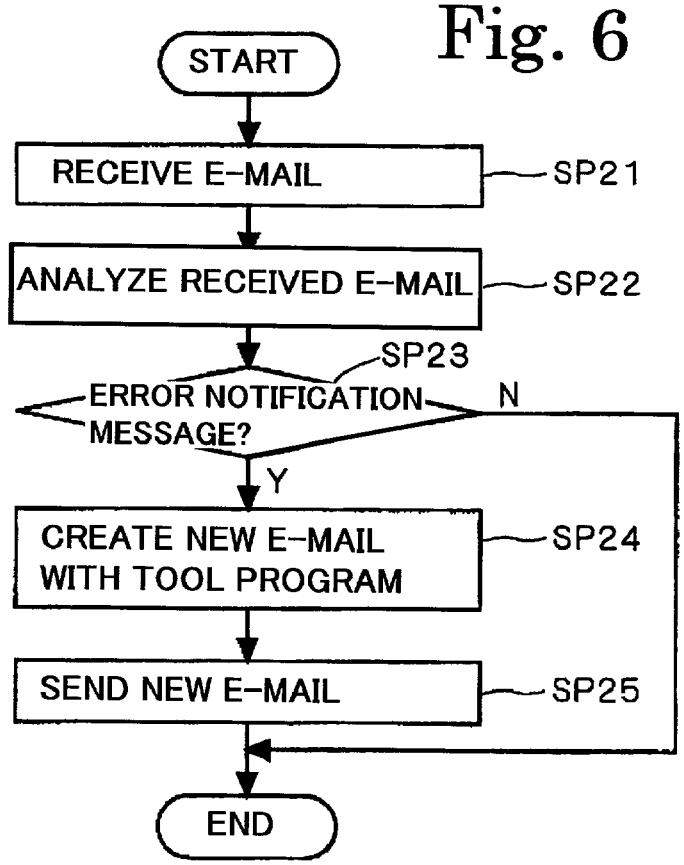
FIG. 6 is a flow chart showing the details of the e-mail checking operation.

FIG. 4 shows the outline of the operation pertaining to this embodiment, and FIGS. 5 and 6 are flow charts showing the sequence of processing carried out by the MFP 1. The sequence of the routine to send large image data D using MFP 1 will be described below with reference to these drawings.

As shown in FIG. 4, an e-mail ML1 to which this image data D is attached is sent by the MFP 1 to a prescribed recipient. FIG. 5 is a flow chart showing the details of this transmission operation. Here, a situation in which image data D obtained by the scanner unit 13 is sent as an attachment to an email ML1 is assumed.

Therefore, in step SP11 of FIG. 5, the scanner unit 13 obtains image data D through electrooptical reading of the image information of an original document, such as photographs, letters and drawings. The image data D thus obtained is converted in the next step SP12 into digital data by an image processing unit not shown and undergoes various types of public-domain image processing. The post-processing image data D is stored on the hard disk 231 in the MFP 1 in step SP13. In FIG. 4, this storage operation is shown by an arrow AR2.

In the next step SP14, the transmission operation to send an e-mail ML1 to which this image data D is attached is carried out. Specifically, the operator performs instruction to designate a recipient and the image data D to be sent, using such user interfaces as the operation unit 11 and the display 12. The operator designates a prescribed e-mail address as the receiving address, and selects the image data D obtained in the above step SP11, for example, as the image data to be sent. The transmission operation to send this e-mail ML1 is then carried out based on this instruction. Specifically, an e-mail ML1 to which the selected image data D is attached is created and sent to the designated recipient in accordance with the contents of the instruction. It is acceptable if the image read in step SP11 is automatically attached to the e-mail ML1. In FIG. 4, the transmission operation to send the e-mail ML1 is indicated by an arrow AR 11.

If the e-mail ML1 is sent normally to the recipient as a result of this transmission operation, this routine comes to an end without any problems. However, where a problem occurs, such as where the size of the attached image data D exceeds a certain maximum limit, as described above, the e-mail ML1 is not sent normally to the recipient, resulting in a transmission error. In this case, an e-mail ME that notifies the operator of the fact that a transmission error occurred in connection with the e-mail ML1 is returned to the MFP 1, i.e., the sender, from the server that detected the transmission error. This transmission error is detected by the mail server on the side of the MFP 1, the mail server on the side of the recipient, or by a relay server located in the transmission path. The MFP 1 then recognizes the occurrence of an error by checking the presence of an e-mail ME that indicates the occurrence thereof.

This e-mail ME is stored on the mail server MS in the same manner as other e-mails received through regular operation. Therefore, the MFP 1 can determine whether a transmission error occurred by accessing the mail server MS to perform an e-mail checking operation and reading out the received e-mails. A situation is described below as an example in which an e-mail ML2 described below is automatically sent following a regular e-mail checking operation that is carried out periodically. However, the present invention is not limited to this implementation. The automatic transmission of an e-mail ML2 may be carried out separately from the regular e-mail checking operation. For example, the received e-mails may be checked after a certain period of time following the transmission of the e-mail ML1, and the e-mail ML2 thereafter sent automatically based on the result of such check.

FIG. 6 is a flow chart showing the details of this e-mail checking operation. In step SP21 of FIG. 6, received e-mails are incorporated by the MFP 1 through access of the mail server MS (a POP server to be more exact). Where read e-mails are included in the received e-mails, only the unread e-mails may be read out from among the received e-mails.

In step SP22, the contents of the received e-mails incorporated in the MFP 1 are analyzed. Where an e-mail ME that indicates a transmission error (hereinafter also referred to as 'error notification message') is included in these received e-mails, the information (the IP address, e-mail address, etc.) pertaining to the recipient for the sent e-mail ML1 regarding which the error occurred is obtained together with the information (the file name, etc. of the image data D) pertaining to the image data attached to the e-mail ML1 by performing further analysis. Specifically, the message ID of the e-mail ML1 regarding which the error occurred is obtained through analysis of the header information in the error notification message ME, and the IP address, etc. of the recipient for the email ML1 and the file name of the image data D, which is the e-mail's attached file, are obtained by referring to the e-mail ML1 specified by the message ID.

In step SP23, based on the results of the above analyses, it is verified whether or not an error notification message ME is included in the received emails, and branching is performed in accordance with the result of the checking. Where it is determined in step SP23 that the received e-mails do not include an error notification message ME, the e-mail checking operation is ended. The email checking operation is also ended if there are no received e-mails. On the other hand, where it is determined that an error notification message ME is included, the CPU 20 advances to the next step SP24. The arrow AR 12 in FIG. 4 indicates the reading of the error notification message ME.

In step SP24, processing to create a new e-mail ML2 to which a tool program TP is attached is executed.

For the recipient for this new e-mail ML2, the same recipient as that for the e-mail ML1 obtained in step SP22 is designated.

The image data D that was attached to the sent e-mail ML1 is not attached to this e-mail ML2, and instead, a prescribed tool program TP is attached. As shown in FIG. 7, this tool program TP includes the access information by which to access the data stored in the storage area (the hard disk 231 in the MFP 1 in this example). This access information comprises information that includes the file name of the image data D attached to the original e-mail ML1 and the storage area in which the image data D is stored.

The file name of the image data D is determined based on the results of the analyses performed in step SP22. For the storage area for the image data D, the same storage area specified in step SP13 may be used. More specifically, the MFP 1, which is the computer in which the storage area resides, is specified by designating the IP address (or the computer name) of the MFP 1, and path information including the drive name and the folder name in the MFP 1 is then further designated. Consequently, a certain folder on the hard disk 231 inside the MFP 1 may be specified as the storage area in which the image data D is stored. By using the information comprising path information to which the file name of the image data D is added, the storage area storing the image data D may be appropriately specified.

The amount of data in this tool program TP is smaller than the amount of data in the image data D. It ranges between tens of kilobytes to several hundred kilobytes, for example. Therefore, an e-mail ML2 that does not exceed the above maximum size limit can be created.

Thereafter, in step SP25, the e-mail ML2 to which the tool program TP is attached is sent to the original recipient (the recipient for the sent e-mail ML1). The arrow AR3 in FIG. 4 indicates the transmission of the e-mail ML2 to the recipient computer 90.

Where multiple error notification messages ME are included in the received e-mails, the processing executed in the steps SP24 and SP25 is performed for each of the multiple error notification messages ME. In this case, the original recipient for the e-mail ML1 that corresponds to each error notification message ME and the image data D that was attached to that e-mail ML1 are identified in reference to the header information in each error notification message ME, and an e-mail ML2 to which is attached a tool program TP by which to obtain the specified image data D can be sent to the appropriate recipient.

At this point, the transmission operation in which an e-mail ML2 is sent from the MFP 1 to the recipient comes to an end.

When the recipient computer 90 receives the e-mail ML2, the operator of the recipient computer 90 opens the e-mail ML2 and executes the tool program TP attached thereto. Specifically, the attached tool program TP is executed by mouse-clicking on the attached file icon displayed on the display screen with regard to the received e-mail ML2, and the file of the image data D is thereby obtained.

The tool program TP is a tool program by which to obtain the data stored in a prescribed storage area. As described above, the tool program TP obtains the designated image data from a prescribed storage area over a network using a prescribed protocol such as FTP (File Transfer Protocol) or HTTP (Hypertext Transfer Protocol). Consequently, the recipient computer can receive the image data D with ease. The communication protocol used for communication between the tool program TP and the MFP 1 is not limited to FTP or HTTP, and may comprise various other protocols including a unique protocol based on local arrangements, such as a protocol using a RAW socket.

As described above, because this tool program TP can enable the recipient computer to access the MFP 1 on which the image data D is stored, using the access information that indicates the file name and the storage area of the image data D attached to the e-mail ML1, the recipient of the e-mail ML2 need not manually input such access information. In addition, it is preferred that the access information in the tool program TP be made confidential, preventing the access information from being divulged to persons other than the sender of the e-mails ML1 and ML2, thereby improving system security.

Furthermore, where the MFP 1 restricts access from other devices, it is preferred that the tool program TP offer access information that also includes the authentication information (the user name, password, etc.) by which to receive access authorization. It is further preferred that in order to increase the level of confidentiality, that is, to improve security, the access information be incorporated in the tool program TP with the authentication information such as the user name and password also being confidential.

Making information 'confidential' as discussed above may comprise encoding using appropriate technological means, but no specific degree of confidentiality is necessarily required. It is acceptable if the information is sufficiently inaccessible such that the contents thereof cannot be viewed through normal operation of the tool program TP. For example, where the contents of the access information such as the recipient's IP address and the folder name is not displayed when the tool program TP is executed, the information is deemed to have been made 'confidential'.

In accordance with the data transmission apparatus of this embodiment, because an e-mail ML1 to which the image data is attached is sent to a prescribed recipient, and because a tool program TP is sent to the same prescribed recipient via an e-mail ML2 when a transmission error is recognized in connection with the e-mail ML1, where a transmission error occurs due to size limits or the like, appropriate handling may be enabled such that a large-sized image data file D may be delivered to the recipient.

<C. Other>

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

While a situation in which the hard disk 231 in the MFP 1 (data transmission apparatus) is used as the data storage area was described in the above embodiment as an example, the present invention is not limited to this implementation, and an external device other than the data transmission apparatus or the storage unit therein may be the data storage area. For example, a prescribed external server that is connected to the MFP 1 over a network may be designated as the storage area for the data, or a prescribed storage unit located in the external server may be more specifically designated as the data storage area.

Figure 8:
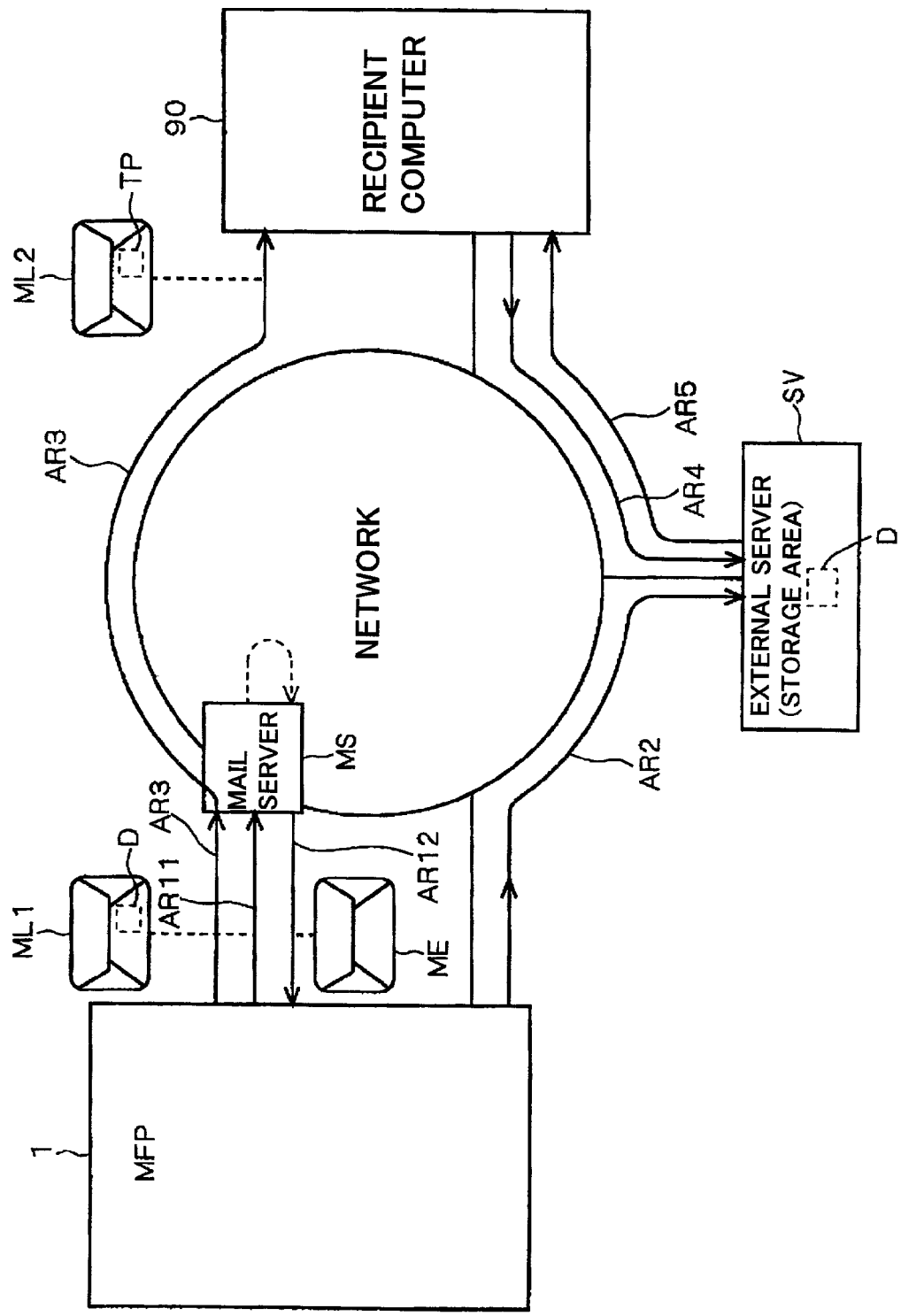
FIG. 8 is a drawing showing the outline of the operation pertaining to a modified example.

FIG. 8 is a drawing showing a modified example in which a prescribed external server is designated as the data storage area.

As shown in FIG. 8, the image data D attached to an e-mail ML1 is also forwarded by the MFP 1 to a prescribed external server SV separately from the e-mail ML1, as indicated by an arrow AR2, and is stored therein. In this forwarding operation, a prescribed protocol such as FTP is used. In addition, because a size limit does not exist for this type of forwarding, or even where a limit does exist, it is larger than the size limit for the transmission of e-mail, the image data D is reliably forwarded to the external server SV.

Furthermore, the tool program TP attached to an e-mail ML2 includes access information by which to access the external server SV. This access information, for example, comprises the IP address of the external server SV. Alternatively, where a prescribed folder in the external server SV is designated as the storage area, it is further preferred that the access information include the folder name in the external server SV as well.

When the tool program TP is executed on the recipient computer 90 that received the e-mail ML2, the image data D stored on the external server SV is sent from the external server SV to the recipient computer 90. The arrows AR4 and AR5 shown in FIG. 8 conceptually indicate (i) the transmission of a file transmission request from the recipient computer 90 to the external server asking that the file containing the image data D should be sent and (ii) the transmission of the file containing the image data D from the external server SV to the recipient computer 90, respectively.

The recipient computer 90 obtains the image data D stored on the external server SV in this way.

A situation in which the image data D is stored beforehand in a prescribed storage area at all times regardless of whether a transmission error occurs regarding the e-mail ML1 was shown as an example in the above embodiment, but the present invention is not limited to this implementation. The image data D may alternatively be stored in a storage area only when a transmission error occurs. For example, as shown in FIG. 8, where an external server SV is designated as the prescribed storage area, the image data D, which is attached to the e-mail ML1, may be sent to the external server SV only when a transmission error occurs.

Furthermore, a situation in which a tool program TP is sent from the sender (MFP 1) to the prescribed recipient (recipient computer 90) as an attachment to an e-mail ML2 was described as an example in the above embodiment, but the present invention is not limited to this implementation. The e-mail transmission unit may be controlled such that the tool program TP by which to obtain the data stored in a prescribed storage area is sent to the prescribed recipient as an e-mail.

For example, an e-mail ML2 in HTML (Hypertext Markup Language) format and incorporating a JAVA applet may be generated as the tool program TP, and the generated e-mail may be sent to the recipient computer 90. In this case, by opening the HTML format e-mail ML2 on the recipient computer 90 and clicking on a prescribed location using the mouse, the tool program TP may be executed. Alternatively, it is also possible to cause the tool program TP to be automatically executed at the same time as the e-mail ML2 is opened.

Moreover, if a volatile program such as a JAVA applet is used, a tool program TP that ends normally can be automatically discarded. If a used tool program TP is discarded, it does not remain in the storage unit of the recipient computer 90 and continue to take up space in the storage unit. This enables more effective utilization of the storage capacity of the storage unit of the recipient computer 90.

In addition, a situation in which the access information is incorporated in the tool program TP in advance was shown as an example in the above embodiment, but the present invention is not limited to this implementation. It is also acceptable if some or all of the contents of the access information described in the text of the e-mail ML2 is input by the operator in accordance with the input dialog displayed by the tool program TP.

Furthermore, a situation in which a tool program TP is sent as an attachment to an e-mail ML2 only when an error occurred was described in the above embodiment, but instead, a tool program TP may be attached to an e-mail each time image data D is sent. In other words, when the user wishes to deliver image data D to a prescribed recipient, an e-mail ML to which a tool program TP and not the image data D is attached may be sent from the start. Alternatively, it is also acceptable if the MFP 1 determines whether or not the size of the image data D exceeds a certain maximum limit prior to the transmission of the e-mail ML1, and where it is determined that the size does exceed the maximum limit, a tool program TP is attached to the e-mail ML1 at all times.

Moreover, a situation in which the image data D is forwarded by the data forwarding unit 32 to a single storage area for storage was described as an example in the above embodiment, but the image data D may be forwarded by the data forwarding unit 32 to multiple storage areas for storage. These multiple storage areas may comprise, for example, the storage unit inside the MFP 1 and an external server SV, or multiple external servers SV. In this case, a selection input screen by which to select a storage area from among multiple storage areas should be prepared by the tool program TP, so that the image data D may be read from the storage area selected by the operator by using the selection input screen.

The image data D may also be stored in the form of multiple files having different formats. In this case, all image data D files may be read via the tool program TP, or only a file that has the selected format may be read where appropriate. In this case, the tool program TP should be programmed such that it can read the image data D from a storage area in which all of the files having different format are stored or another storage area in which files having the selected format are stored.

In addition, an MFP 1 was used as an example of the data transmission apparatus in the above embodiment, but the present invention is not limited to this implementation. A device that has e-mail transmission functions, such as a personal computer or a cellular telephone, may be used as the data transmission apparatus. In such a case, the device may be made to function as a data transmission apparatus that performs the transmission/receipt processing pertaining to the present invention by enabling it to execute a program having the same features as the program described above. Such a program may be delivered as recorded on a recording medium such as a flexible disk or CD-ROM or, delivered over a network.

Furthermore, while a situation in which image data read by the scanner unit 13 was used as the image data D attached to the e-mail ML1 was described as an example in the above embodiment, image data obtained through other methods may be used instead. For example, such image data may comprise image data received via facsimile communication over public telephone lines.

In addition, while a situation in which image data (still image data) is delivered to the recipient was described as an example in the above embodiment, the present invention may alternatively be applied in a situation in which types of data other than still image data (such as moving image data or sound data, for example) are delivered to the recipient.

As described above, in accordance with the present invention, data is stored in a prescribed storage area and a tool program by which to obtain the data stored in the prescribed storage area is sent to a prescribed recipient via email. Therefore, large-sized data files may be delivered to the recipient using email without the need for special installation of a software program on the side of the recipient.

In particular, if a first e-mail to which data is attached is sent to the prescribed recipient and a tool program is sent to the same prescribed recipient using a second e-mail when a transmission error is recognized in connection with the first e-mail, appropriate handling is enabled such that delivery of large-sized data files to the recipient is ensured despite the occurrence of a transmission error.

In addition, where access information to enable the prescribed recipient to access the data stored in the storage area is incorporated beforehand in the tool program, it is not necessary for the recipient of the second e-mail to manually input the access information. Furthermore, where the access information is incorporated in the tool program in a confidential manner, improved security may be attained.

What is claimed is:

1. A data transmission apparatus comprising:
an e-mail transmission unit for sending e-mail;
a data forwarding unit for forwarding data to a prescribed storage area;
a controller for controlling the e-mail transmission unit such that a tool program by which to obtain the data stored in the prescribed storage area is sent to a recipient using e-mail; and
a recognition unit for recognizing e-mail transmission errors, wherein the controller controls the e-mail transmission unit such that the e-mail transmission unit sends to the recipient a first e-mail and a second email, wherein the controller controls the email transmission unit to send the tool program to the recipient using the second e-mail, when a transmission error is recognized by the recognition unit in connection with the first e-mail.

2. The data transmission apparatus according to claim 1, wherein the prescribed storage area comprises a storage unit residing inside the data transmission apparatus.

3. The data transmission apparatus according to claim 1, wherein the prescribed storage area comprises an external device other than the data transmission apparatus or a storage unit inside the external device.

4. The data transmission apparatus according to claim 1, wherein the tool program includes access information based on which the recipient can access the data stored in the prescribed storage area.

5. The data transmission apparatus according to claim 4, wherein the access information is incorporated in the tool program in a form such that the confidentiality of the access information is maintained.

6. The data transmission apparatus according to claim 1, wherein the data to be handled includes image data.

7. The data transmission apparatus according to claim 1, further comprising an image reader for reading an image of an original document to obtain image data thereof,
and wherein the data to be handled includes the image data obtained by the image reader.

8. A method for delivering data for use with a data transmission apparatus, the method comprising the steps of:
(a) storing data in a prescribed storage area;
(b) sending to the recipient a first e-mail,
(c) sending to a recipient via a second e-mail a tool program by which to obtain the data stored in the prescribed storage area when a transmission error occurred in connection with the first e-mail.

9. The method according to claim 8, wherein the tool program includes access information based on which the recipient can access the data stored in the prescribed storage area.

10. The method according to claim 9, wherein the access information is incorporated in the tool program in a form such that the confidentiality of the access information is maintained.

11. The method according to claim 8, wherein the data to be handled includes image data.

12. A computer readable medium storing program executable by a computer to make a computer perform a routine comprising the steps of:
(a) storing data in a prescribed storage area;
(b) sending to the recipient a first e-mail; and
(c) sending to a recipient via e-mail a tool program by which to obtain the data stored in the prescribed storage area when a transmission error occurred in connection with the first e-mail.

13. The computer readable medium according to claim 12, wherein the tool program includes access information based on which the recipient can access the data stored in the prescribed storage area.

14. The computer readable medium according to claim 13, wherein the access information is incorporated in the tool program in a form such that the confidentiality of the access information is maintained.

15. The computer readable medium according to claim 12, wherein the data to be handled includes image data.

16. The data transmission apparatus according to claim 1, wherein the first email includes the forwarded data.

17. The method according to claim 8, further comprising a step of:
attaching the data to the first e-mail.

18. The computer readable medium according to claim 12, wherein the routine further comprises a step of attaching the data to the first e-mail.

* * * * *